Patented Dec. 9, 1952

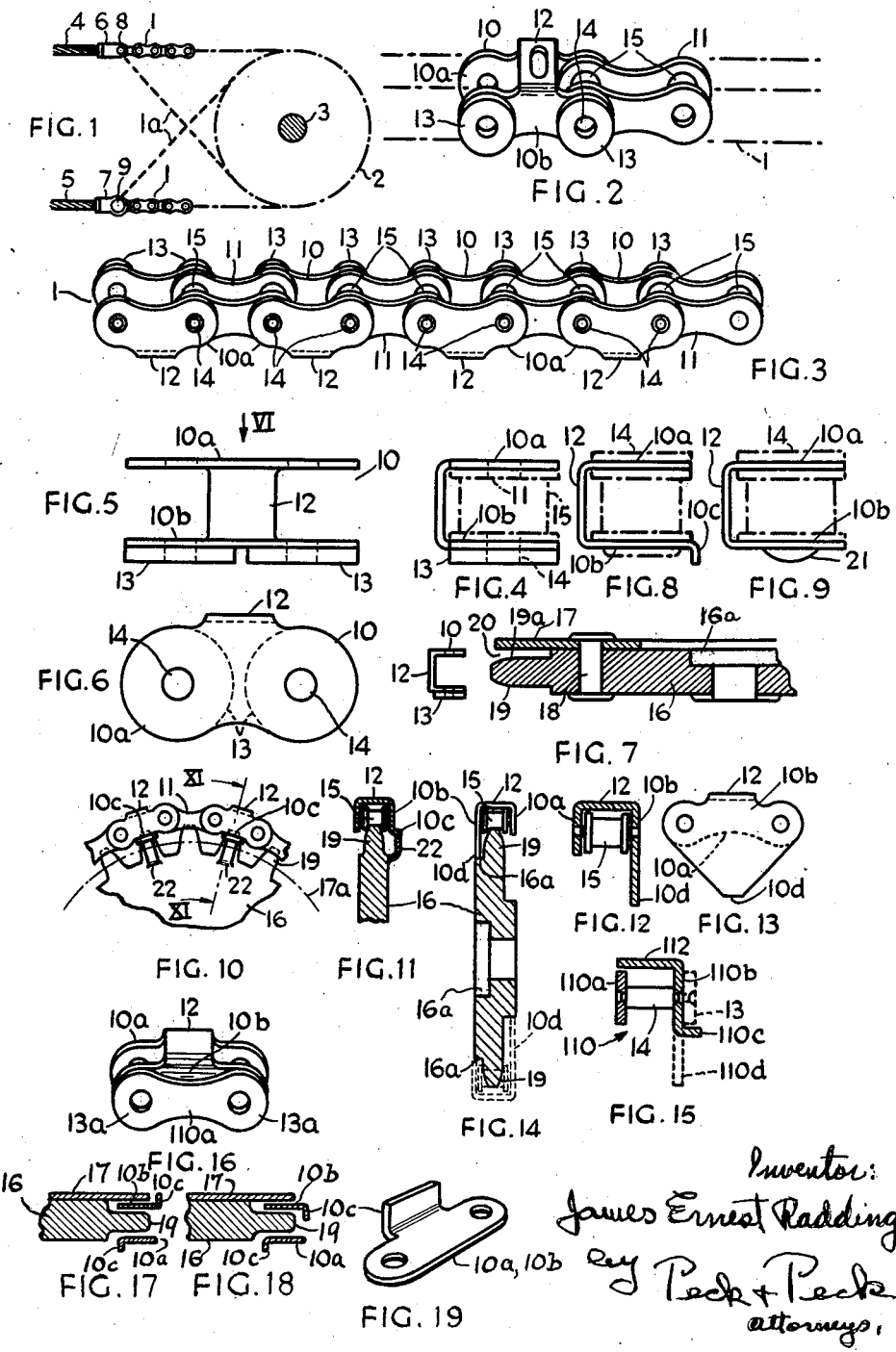

2,620,676

UNITED STATES PATENT OFFICE 2,620,676

CHAIN AND SPROCKET TRANSMISSION

James Ernest Raddings, Totland Bay,
Isle of Wight

Application December 18, 1948, Serial No. 66,074
In Great Britain December 19, 1947

15 Claims. (Cl. 74—243)

This invention concerns chain and sprocket transmissions and has for its object to provide a construction in which the chain cannot be engaged with the sprocket in any but the correct relative attitude; i. e. if reversed end for end, or if turned over, the chain cannot engage the sprocket teeth. Such transmissions have particular, although not exclusive, application in aircraft control systems whereby remote parts such as flaps or rudder surfaces, or fuel or oil control valves, are required to be moved from the cockpit. Such control systems normally comprise a combination of elements working in tension, such as cables, rods, and chains, the chains passing over driving or driven sprockets to transmit the controlling effort to the part to be moved. Since the controlled part is generally required to be moved positively in either direction, and the control elements operate only in tension, each control system normally comprises parallel channels, and unless careful precautions are taken it is frequently possible to cross the two channels of a control system so that the controlled part is moved oppositely to the desired direction.

In spite of such precautions as the use of different sizes or types of connectors for elements in one channel to those in the other, control systems have still become crossed due to the possibility of reversing a chain end for end and crossing over its end connectors, or of wrapping a chain round a sprocket in the wrong direction, and it is an object of the present invention to provide a construction whereby this is impossible.

In a chain and sprocket transmission according to the present invention, both the chain and the sprocket are provided asymmetrically with interengageable formations which prevent engagement between the pins or rollers of the chain and the teeth of the sprocket in any but a predetermined attitude of the chain relative to the sprocket.

Preferably the interengaging formations comprise a bridge piece connecting the two sides of a link along the one edge thereof so as to engage the sprocket teeth only when this edge of the chain is presented to the sprocket and thus to prevent engagement of the pins or rollers of the chain with the sprocket teeth, in combination with a lateral projection on one only of the said link sides to co-operate with a projection on one side only of the sprocket for preventing engagement of the pins or rollers of the chain with the sprocket teeth when the chain is presented thereto with the projections on both the link and the sprocket on the same side of the sprocket teeth.

In order that the invention may be more clearly understood, alternative constructions of chain and sprocket in accordance therewith will now be described by way of example with reference to the accompanying drawings in which:

Fig. 1 is a general diagrammatic view of a chain and sprocket portion of a conventional form of flexible transmission showing the different arrangements of the end connections to adjacent cable sections;

Fig. 2 is a top perspective view of two links of a non-reversible chain constructed in accordance with the present invention;

Fig. 3 is an under perspective view of several links of the chain illustrated in Fig. 2;

Fig. 4 is an enlarged end view of the asymmetrical link shown in Figs. 2 and 3;

Fig. 5 is an underplan view of the link of Fig. 4;

Fig. 6 is a side elevation on the line VI of Fig. 5;

Fig. 7 is a fragmentary sectional view of one form of asymmetrical sprocket and chain link according to the present invention;

Fig. 8 is an end elevation of an alternative form of asymmetrical link;

Fig. 9 is an end elevation of a further alternative form of asymmetrical link;

Fig. 10 is a fragmentary side elevation of another form of sprocket showing a chain incorporating the links of Fig. 9 incorrectly presented thereto;

Fig. 11 is a sectional elevation on the line XI—XI of Fig. 10;

Fig. 12 is a sectional elevation of another form of asymmetrical link;

Fig. 13 is a side elevation of the link shown in Fig. 12;

Fig. 14 is a sectional elevation of a sprocket for use with the asymmetrical link of Fig. 12, Fig. 15 shows in section an alternative construction of asymmetrical link, and Fig. 16 shows a still further alternative construction of asymmetrical link.

Fig. 1 illustrates diagrammatically a portion, including a chain and sprocket stage, of a flexible transmission system of conventional construction such as is commonly used in, say, aircraft for controlling flaps, rudders, or the like. The chain 1 passes round the sprocket 2 which is keyed on a shaft 3 whose angular position is to be controlled from a remote point. The chain is to be connected at its ends to two cables 4, 5 by means of respective connectors 6, 7, the connector 6 engaging a small pin 8 at one end of the chain 1 while the connector 7 engages a large pin 9 at the other end of the chain. The difference in size of the pins 8, 9, with the consequent differences in the two connectors 6, 7, is normally relied upon to prevent incorrect connection of the chain 1 to the cables 4, 5, but it will be apparent that, with a chain which is symmetrical about the plane containing the axes of its pins or rollers, the crossing of the chain 1 and its passage round the sprocket 2 in the reverse direction, as indicated by the dotted lines 1a, cannot be positively prevented by the use of dissimilar end connectors 6, 7. The risk of this incorrect connection is increased where, in actual practice, the diameter of the sprocket 2 is small compared with the length of the chain section 1, and the latter is passed round several guide pulleys or sprockets in different planes before connection to the cables 4, 5.

Fig. 2 illustrates a pair of adjacent links 10, 11 of a non-reversible chain 1 and Fig. 3 illustrates a section of this chain. The link 11 is a normal inner link of a standard roller chain, but the link 10 is of asymmetrical construction (see also Figs. 4-6), having a bridge piece 12 connecting the outer edges of the link sides, and discs 13 mounted on the ends of the pivot pins 14 of the chain rollers 15. The bridge piece 12 is preferably formed integral with the link sides and is of relatively narrow width in the direction of the chain 1. The discs 13 may be constituted either by washers or integral heads on the connecting pins 14, and having a diameter substantially equal to the diameter of a roller 15 of the chain 1.

Referring now to Fig. 7, the sprocket 16 is provided on one face thereof with an annular plate 17 which is secured, as by rivets 18, to the sprocket and has an outer diameter equal to the sprocket diameter measured across the tips of the teeth 19. The other side of the sprocket 16 is left free, and the lateral clearance 20 between the adjacent flanks 19a of the sprocket teeth 19 and the inner surface of the annular plate 17 is such as to afford free entry of the plain sides 10a of the outer links 10 of the chain 1.

If, however, the chain 1 is presented to the sprocket 16 so that the washers or heads 13 are on the same side of the sprocket teeth 19 as the annular plate 17, the rim of the latter engages the said washers or heads 13 and prevents the rollers 15 from engaging the sprocket teeth 19. The chain 1 must therefore be reversed end for end before it can be engaged with the sprocket.

Similarly, if the chain 1 is turned over so that the bridge pieces 12 are on the inside of the chain 1, towards the axis of the sprocket 16, these bridge pieces 12 will engage the tips of the teeth 19 and again prevent the rollers 15 from being engaged thereby. The chain 1 must therefore be turned over—e. g. by uncrossing—or be wrapped around the sprocket 16 on the other side of the axis thereof to engage the teeth 19. It will thus be seen that there is only one attitude of the chain 1 relative to the sprocket 16 in which the two parts can mesh together correctly, and hence the risk of crossing the control connections by incorrectly assembling the chain and sprocket transmission is eliminated.

There are four possible attitudes of the chain relative to the sprocket. If the chain is regarded as lying in a straight line and engaged tangentially with the sprocket, its ends may be designated the right and left hand ends. In the correct position or attitude of the chain relative to the sprocket the right and left hand ends are in the right and left hand positions respectively, and the chain is tangential to the sprocket on the correct side of the axis of the latter. This may be termed the first of the four possible attitudes.

The second attitude is achieved by reversing the chain end for end so that its right hand end is in the left hand position and vice versa. The chain still makes contact with the sprocket, however, on the correct side of the sprocket axis.

In the third alternative position, the chain has its right and left hand ends in their correct position but is engaged with the sprocket on the wrong side of its axis. This is equivalent to taking the chain in its first or correct attitude and turning it about its longitudinal axis through 180°.

In the fourth possible attitude, the chain is reversed end for end and engages the sprocket on the wrong side of its axis.

Instead of providing the pins 14 with enlarged heads or washers 13, the free edge of the side 10b of a bridged link 10 may be provided with a small out-turned projection 10c (Fig. 8) of a length sufficient to engage the rim of the annular plate 17 should the chain 1 be incorrectly presented to the sprocket 16 so that this side 10b of the bridged link faces in the same direction as the side of the sprocket 16 to which the plate 17 is secured.

Fig. 9 shows a still further form of link 10 in which the one ends of the pins 14 are provided with projecting domed heads 21 of a size to prevent their entry into the clearance space 20 of Fig. 7.

Various alternative arrangements of sprocket 16 may be adopted as desired. For example, the annular plate 17 may be formed integral with the sprocket 16 or it may be welded thereto. Its external diameter may also be varied in correspondence with variations in the size of the enlarged head 21 or washer 13 on the pins 14, or the depth, considered radially of the sprocket 16, of the projections 10c on the link sides 10b, as shown by the chain dotted lines 17a of Fig. 10.

Alternatively the annular plate 17a may be replaced by a plurality of projections 22 (Figs. 10 and 11) suitably positioned on one surface of the sprocket 16 adjacent the teeth 19 to engage the lateral projections 10c (Fig. 8) on the links 10.

Instead of providing one side 10b of a bridged link 10 with a small out-turned projection 10c of a length sufficient to engage the projections 22 or the rim of the annular plate 17a should the chain 1 be incorrectly presented to the sprocket 16, the said side 10b of the bridged link 10 may be provided with a flat depending projection 10d (Figs. 12 and 13) to lie in a plane parallel to the plane of the sprocket 16, and the latter may be provided with a shoulder 16a of a diameter to engage the extremity of the said projection 10d in such a way as to prevent engagement of the pins or rollers 15 of the chain 1 with the sprocket teeth 19 when the chain is presented to the sprocket in the incorrect way, as indicated at the top of Fig. 14.

Fig. 15 illustrates in section an alternative method of construction of an asymmetrical link 110. The link consists of a standard form of link side 110a and a special form of side 110b.

The latter has an integral tongue 112 formed centrally of its length along one edge and bent over laterally inwards to form a bridge piece extending as far as the side 110a. The other edge of the side 110b may be bent outwards to form a lateral projection 110c or extended in its own plane to form a projection 110d, shown dotted. Alternatively again, the projection 110c or 110d may be omitted and the standard connecting pin 14 lengthened to accommodate a washer 13 or formed to a head as shown at 21 in Fig. 9.

Fig. 16 shows an alternative construction of the link shown in Fig. 4-6, in which the washers 13 are replaced by a standard link side 110a, the part circular end formations 13a simulating the washers 13 in appearance and function. In all forms of asymmetrical link 10, the bridge piece may be separately attached, as by welding, to one or both link sides 10a, 10b after assembly thereof on the pins 14.

Figs. 17, 18 and 19 illustrate a still further form of construction of chain and sprocket transmission according to the invention. The chain 1 consists partly or wholly of links 10 having their sides 10a, 10b of the same size and shape with integral lateral projections 10c on the one edge thereof. In the form shown in Fig. 17, the link sides 10a, 10b are assembled with the projections 10c outwardly directed and located on opposite edges, the projection 10c on the link side 10a being operative to engage the rim of the disc 17 to prevent engagement of the chain 1 with the sprocket 16 should the chain be reversed end for end. Furthermore, if the chain is to be passed, in opposite directions around two closely adjacent sprockets 16, the arrangement of the projections 10c prevent engagement of the chain with both sprockets 16 in any but the correct manner.

In the form shown in Fig. 18, the link side 10b is reversed with respect to the arrangement shown in Fig. 17 so that its projection 10c is turned inwards and is operative to engage the sprocket teeth 19 if the chain is presented to the sprocket 16 for wrapping in the wrong direction. Similarly, if the chain is reversed end for end, the projection 10c on the other link side 10a engages the rim of the disc 17. The chain 1 can thus only be engaged with sprocket 16 in one relative attitude.

The sprocket 16 is preferably arranged in all cases so that it can only be assembled on its shaft one way round. For example, it may be provided with a concentric recess 16a on one side to engage a corresponding shoulder on the shaft (not shown). It will be understood that where the chain 1 has only a limited travel with respect to the sprocket 16, the asymmetrical links 10 need only be provided over that length thereof which engages the sprocket teeth 19.

What I claim is:

1. A chain and sprocket transmission comprising a chain incorporating a link having an asymmetrical formation, and a sprocket having an asymmetrical formation to coact with the said formation on the chain link for preventing driving inter-engagement of the chain with the sprocket in all relative positions of the chain and sprocket save one.

2. A chain and sprocket transmission comprising a sprocket having an asymmetrical lateral projection, a chain incorporating a link having a formation on an edge thereof to engage the tips of the sprocket teeth when the chain is presented to the sprocket in the inverted position and a projection on one side thereof engageable with the asymmetrical lateral projection on the sprocket when the chain is presented to the sprocket in the wrong sense.

3. A chain and sprocket transmission comprising a sprocket having an asymmetrical formation and a chain consisting of alternate symmetrical and asymmetrical links, the asymmetrical formation on the latter being engageable with the asymmetrical formation on the sprocket to prevent driving interengagement of the chain therewith in all relative positions of the chain and sprocket save one.

4. A chain and sprocket transmission having an asymmetrical sprocket and chain link having an inwardly directed formation on one edge thereof to engage the tip of a sprocket tooth when the link is presented to the sprocket upside down, and a projection on one side thereof to engage the asymmetrical formation on the sprocket when the link is presented thereto the wrong way round.

5. In a chain and sprocket transmission as claimed in claim 4, a chain link having a bridge piece connecting the corresponding one edges of the link sides.

6. In a chain and sprocket transmission as claimed in claim 5, a chain link having a lateral projection on the edge opposite to the bridge piece and a sprocket having a coacting formation adjacent the one flank of a sprocket tooth.

7. In a chain and sprocket transmission as claimed in claim 4, a chain link having a projection lying in the plane of one side of the link and a sprocket having an annular shoulder on one side face thereof to engage the said projection when the link is presented to the sprocket the wrong way round and so prevent driving engagement of the link with a sprocket tooth.

8. In a chain and sprocket transmission as claimed in claim 4, a chain link having a radially enlarged formation on the one end of each link connecting pin and a sprocket having a formation on the one face thereof to coact with the said radially enlarged formation for preventing driving engagement of the link with a sprocket tooth when the link is presented to the sprocket the wrong way round.

9. In a chain and sprocket transmission as claimed in claim 1, a chain link wherein the asymmetrical formation thereon comprises a bridge piece connecting the edges of the link sides and a projection on the opposite edge of one of the sides, and a sprocket having a formation on one side face thereof to coact with the said projection on the link side for preventing incorrect engagement of the link with the sprocket.

10. In a chain and sprocket transmission as claimed in claim 1, a chain link having two separate sides wherein the asymmetrical formation on the link comprises a laterally inward projection on one edge of one side extending towards the corresponding edge of the other side.

11. In a chain and sprocket transmission as claimed in claim 1, a chain wherein the asymmetrical formation thereon includes a lateral projection on one side of a link and a sprocket having an asymmetrical formation constituted by an annular plate located adjacent the one flanks of the sprocket teeth and spaced therefrom by a clearance space for accommodating the sides of the chain links not provided with an asymmetrical formation when the chain is correctly presented to the sprocket.

12. In a chain and sprocket transmission as claimed in claim 1, a chain wherein the asymmetrical formation thereon includes a lateral projection on one side of a link and a sprocket having a formation on one side thereof located adjacent a tooth and spaced from the adjacent flank of the tooth by a clearance space for accommodating the sides of the chain links not provided with an asymmetrical formation when the chain is correctly presented to the sprocket.

13. In a chain and sprocket transmission as claimed in claim 1, a chain wherein the asymmetrical formation thereon comprises a projection on one edge of a side of a chain link and a sprocket having an annular shoulder on one side thereof adjacent the roots of the teeth for coacting with the said projection on a chain link to prevent incorrect engagement of the link with the said sprocket tooth.

14. In a chain and sprocket transmission as claimed in claim 1, a chain link having two separate sides wherein the asymmetrical formation on the link comprises a laterally inward projection on one edge of one side extending towards the corresponding edge of the other side and a projection formed on the opposite edge thereof.

15. A chain and sprocket transmission system comprising a chain and sprocket wherein there is one correct attitude of the chain relative to the sprocket, coacting formations on the chain and sprocket, respectively, for preventing driving interengagement of the chain and the sprocket when said chain is reversed end for end from the correct attitude thereof and said chain engages said sprocket on the correct side of the sprocket axis, and a further formation on the chain for preventing driving interengagement of the chain and sprocket when the ends of said chain are in their correct attitudes but the chain engages said sprocket on the opposite side of the sprocket axis from that engaged when the chain is in its correct attitude or when said chain is reversed end for end and engages said sprocket on the opposite side of the sprocket axis from that engaged when the chain is in its correct attitude.

JAMES ERNEST RADDINGS.

REFERENCES CITED

The following references are of record in the file of this patent:

UNITED STATES PATENTS

| Number | Name | Date |
|---|---|---|
| 618,083 | Gentry | Jan. 24, 1899 |
| 1,508,446 | Diehl | Sept. 16, 1924 |
| 1,813,011 | Adams | July 7, 1931 |